United States Patent [19]

Kimata et al.

[11] 4,184,505

[45] Jan. 22, 1979

[54] FUEL FLOW RATE MEASURING DEVICE

[75] Inventors: Kei Kimata, Aichi; Yoshinobu Yasuda, Iwata; Isamu Yoshida, Iwata; Masahiro Saruta, Iwata, all of Japan

[73] Assignee: NTN Toyo Bearing Co., Ltd., Osaka, Japan

[21] Appl. No.: 893,681

[22] Filed: Apr. 5, 1978

[30] Foreign Application Priority Data

Apr. 5, 1977 [JP] Japan .............................. 52/42899[U]
May 6, 1977 [JP] Japan .............................. 52/57857[U]
May 7, 1977 [JP] Japan .............................. 52/57653[U]

[51] Int. Cl.² .......................................... G05D 11/00
[52] U.S. Cl. ..................................................... 137/117
[58] Field of Search .......................... 137/117, 98, 100

[56] References Cited

U.S. PATENT DOCUMENTS 2,592,304   4/1952   Lubeley ................................. 137/100
2,917,067   12/1959  Pearl ..................................... 137/117

Primary Examiner—Anthony V. Ciarlante
Attorney, Agent, or Firm—Armstrong, Nikaido, Marmelstein & Kubovcik

[57] ABSTRACT

A fuel flow rate measuring device comprising a control rod axially movable in proportion to the rate of flow of air flowing through a suction pipe, a ball disposed in a taper bore and adapted to be moved in the taper bore by the control rod, the taper bore and the ball cooperating with each other to define a clearance which is variable in proportion to the rate of flow of the air, and a pressure regulator provided between a fluid inlet and outlet for keeping constant the fluid pressure difference across the clearance defined by the taper bore and ball.

8 Claims, 9 Drawing Figures

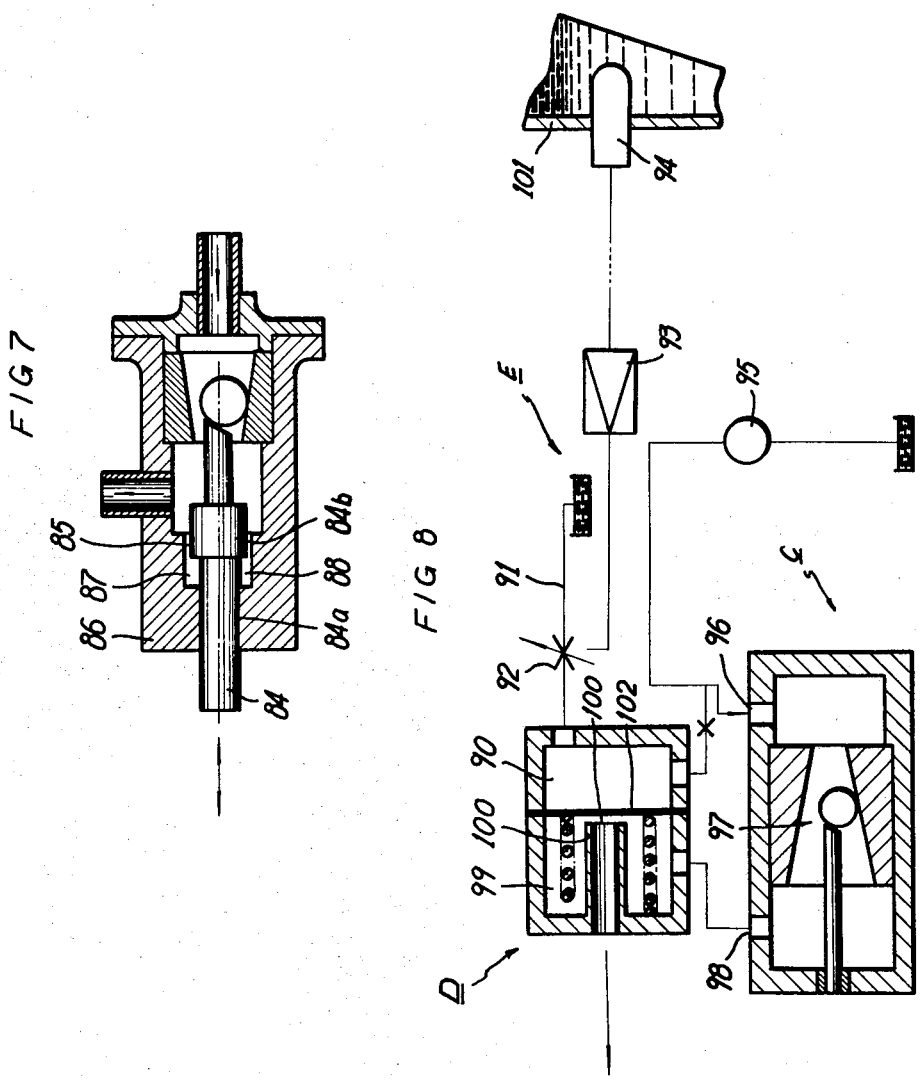

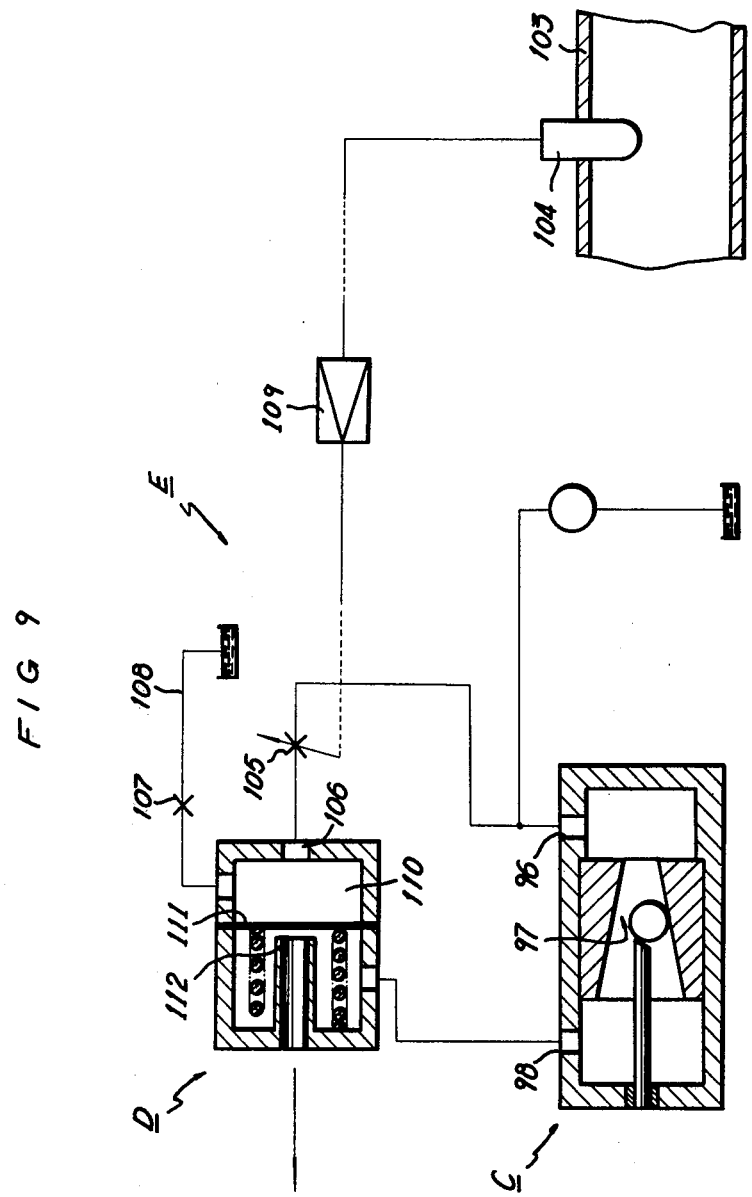

FUEL FLOW RATE MEASURING DEVICE

BACKGROUND OF THE INVENTION (a) Field of the Invention

The present invention relates to a device for measuring and controlling the rate of flow of a fluid.

(b) Description of the Prior Art

Heretofore, devices of this type for measuring and controlling the rate of microflow have employed needle valves and slits and required high machining accuracy. Another problem is that the coefficients of discharge tend to vary with the area of opening. Thus, it has been difficult to obtain a device which provides high accuracy for measurement.

SUMMARY OF THE INVENTION

The present invention relates to a fuel flow rate measuring device comprising a flow rate measuring section constituted by a bore whose cross-section is not uniform, a ball placed in said bore and a control rod, the clearance between said bore and ball being regulated by axially moving said control rod or by axially moving said bore in accordance with variations in the viscosity of the fluid due to temperature variations, and a pressure control valve provided between the inlet and outlet sides of said flow rate measuring section for maintaining the pressure difference between the inlet and outlet sides at a constant value, so that the position of the control rod and the flow rate of the fluid correspond to each other in a fixed relation.

FEATURES OF THE INVENTION

According to the present invention, since the flow rate measuring section is composed of a bore whose cross-section is not uniform, i.e., a taper bore, a ball disposed in said taper bore and a control rod, a high precision area type flow rate measuring device can be obtained which requires simple machining.

In the invention, since a pressure regulator is provided between the inlet and outlet sides of said flow rate measuring section, the flow rate of a fluid can be uniquely proportionated to the area of opening of a crescent channel defined by said taper bore and ball in said measuring section.

In the invention, the area of opening of the channel in flow rate measuring section can be proportionated to the flow rate of the suction air by proportionating the axial displacement of the control rod by the output from the flow rate measuring section. Thus, the ratio of fuel to air can be kept constant. If, therefore, the invention is applied to a fuel supplying device for an internal combustion engine, it is possible to maintain the air-fuel ratio at a constant value.

In the invention, the end surface of the control rod shaped to provide a slope downwardly directed with respect to the axis of the control rod, so as to hold the ball in contact with the end slope of the control rod under the fluid pressure. Therefore, even if a lift is exerted on the ball owing to variations in the velocity of the fluid in the channel, the ball is pressed against the lower surface region of the taper bore by a downward force component exerted on the ball when the latter is pressed against the slope by the fluid pressure. Therefore, the ball can always be held in a stable state.

In the invention, a sleeve having a bore whose cross-section is not uniform is slidably disposed in a body having a fluid supply port and a fluid discharge port, and a temperature-sensitive element is disposed between said sleeve and said body so as to axially displace the sleeve in connection with variations in the temperature of the fluid. Therefore, the area of the channel can be automatically regulated in correlation with variations in the viscosity of the fluid. Therefore, the flow rate can be accurately measured irrespective of variations in the temperature of the fuel.

In the invention, a sleeve having a bore whose cross-section is not axially uniform is urged against the end surface of an adjusting screw by a spring through a holder plate. Therefore, the zero point for the flow rate detecting valve of the air flow rate measuring device and the zero point for the fuel rate measuring device can be easily adjusted by turning the adjusting screw to change the axial position of the sleeve.

In the invention, the control rod is formed with a step which cooperates with the bore of the body to define a cavity communicating with the fluid channel, through a narrow channel, thereby providing a damper mechanism. Therefore, the vibration of the air flow rate detecting valve due to the pulsation of air being sucked into the engine can be attenuated.

In the invention, a stabilizing rod under the action of a stored resilient force is opposed to the control rod which controls the axial position of the ball so that said stabilizing rod will force the ball into contact with the end surface of the control rod. Therefore, the ball can be kept stabilized under any conditions. Therefore, changes in the coefficient of discharge due to the otherwise possible unstable vibration of the ball can be precluded.

In the invention, the primary pressure in the pressure regulator is controlled by a sensor for detecting the operating conditions of an internal combustion engine, such as the temperature of the cooling water and the concentration of the oxygen remaining in the exhaust gas, and/or a device for simulating the operating conditions, a variable choke disposed in the fuel supply channel or fuel return channel, and a controller for controlling the degree of opening of the variable choke by a signal from said sensor. Therefore, the flow rate measuring device can accommodate itself to any circumstances.

BRIEF DESCRIPTION OF THE DRAWINGS

FIG. 7 is a diagrammatic view of a mechanism for attenuating the vibration of the control rod;

FIG. 8 is a diagrammatic view of flow rate compensating device adapted to be actuated in response to require conditions; and FIG. 9 is a diagrammatic view of another embodiment of the invention.

DESCRIPTION OF THE PREFERRED EMBODIMENTS

Figure 1:
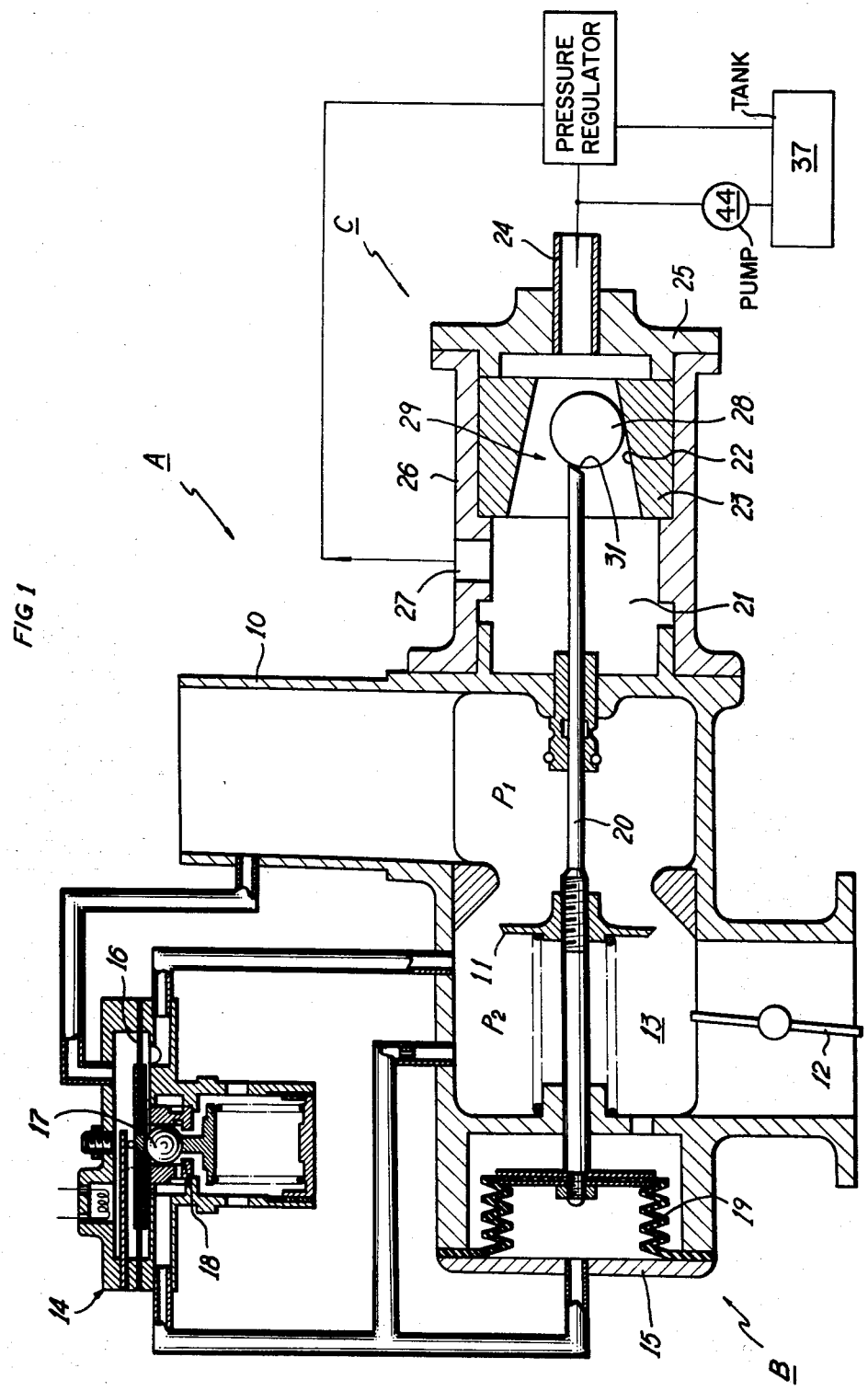
FIG. 1 is a diagrammatic view showing the relation between a suction air flow rate measuring device and a fuel flow rate measuring device.

FIG. 1 illustrates a fuel flow rate measuring device according to the present invention applied to a fuel injector. The fuel injector A shown in FIG. 1 comprises a suction air flow rate measuring device B and a fuel flow rate measuring device C.

The suction air flow rate measuring device B comprises an area type flow rate measuring mechanism for measuring the suction air flow rate on the basis of the area of opening of a flow rate detecting valve 11 by keeping the pressure difference (P1-P2) at a predetermined value, where P1 is the pressure upstream of the flow rate detecting valve 11 disposed in a suction pipe 10 and P2 is the pressure in an intermediate chamber 13 defined between the flow rate detecting valve 11 and a throttle valve 12, a servo-valve 14 for detecting the deviation of the pressure difference (P1-P2) across the flow rate detecting valve and amplifying the same, and a valve opening mechanism 15 for opening and closing the flow rate detecting valve 11 by the output from the servo-valve 14. More particularly, if the pressures P1 and P2 acting on the upper and lower surfaces of a pressure difference setting diaphragm 16 are deviated from the set values, the pressure difference setting diaphragm 16 is displaced, producing a displacement of an air valve 17, so that the area of the opening in a variable orifice 18 is changed, whereupon, the pressure in the bellows 19 of the valve opening mechanism 15 is changed. Ultimately, the flow rate detecting valve 11 interlocked to the bellows 19 is opened or closed by an amount corresponding to the pressure variation so as to keep the pressure difference (P1-P2) at the predetermined value. In addition, 20 designates a control rod joining the bellows 19 to the flow rate detecting valve 11.

The fuel flow rate measuring device C, which is the subject matter of the present invention, has a chamber 21 with one end thereof opened, said chamber having a sleeve 23 received therein, said sleeve being fixed in position in a body 26 by a cover member 25 having a fluid inlet 24. On the other side of said chamber 21, it is provided with a fluid outlet 27. The numeral 28 designates a high precision ball-bearing ball disposed in the taper bore 22, said ball 28 cooperating with the taper surface of the taper bore 22 to define a fluid channel (clearance) 29. The control rod 20 extends into the body 26 and has its front end 31 shaped to provide a slope downwardly directed with respect to the axis.

Figure 2:
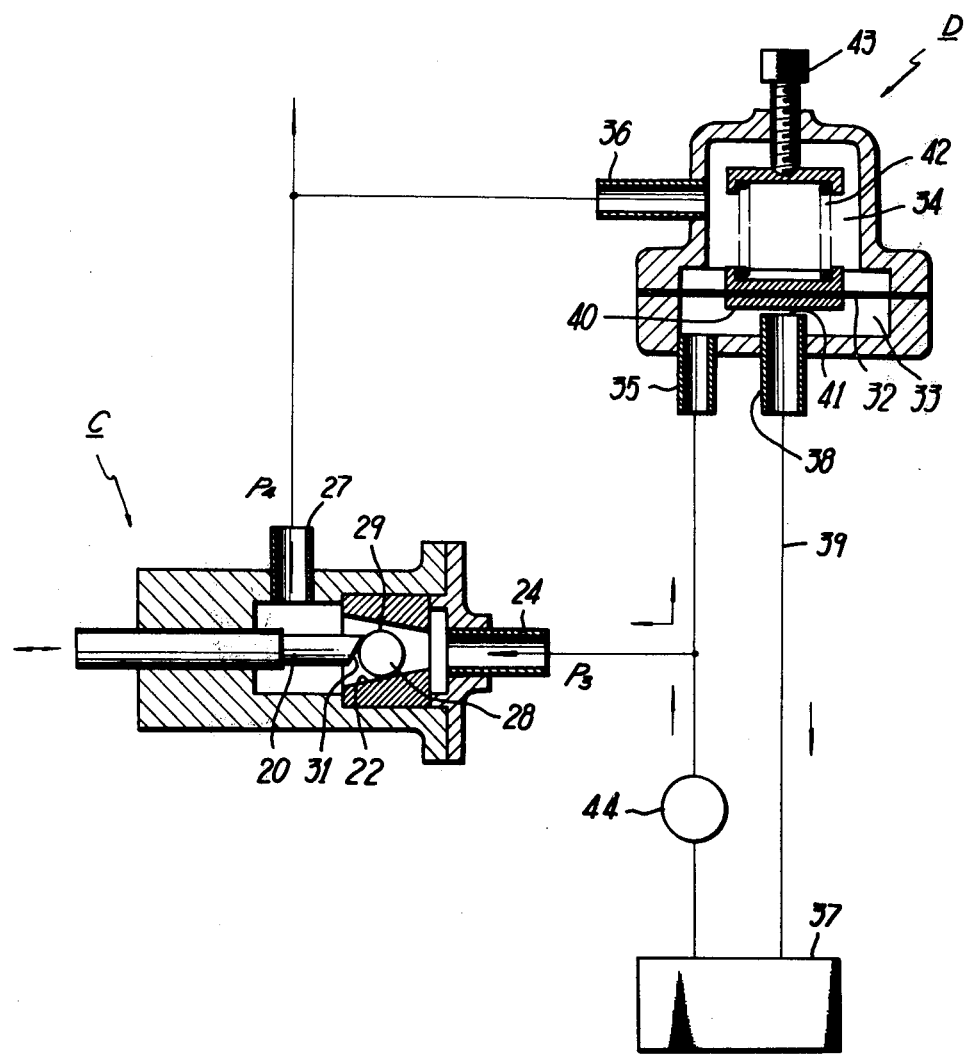
FIG. 2 is a diagrammatic view showing the relation between the fuel flow rate measuring device and a pressure regulator.

FIG. 2 shows the relation between the flow rate measuring device C and a pressure regulator D. The pressure rugulator D has chambers 33 and 34 separated by a diaphragm 32, said chamber 33 communicating with the inlet 24 of the flow rate measuring section C through a communication port 35, said chamber 34 communicating with the fluid outlet 27 of the flow rate measuring section C through a communication port 36. The chamber 33 has a valve 38 and a channel 37 for returning the fluid to a tank 37, the rate of flow being determined by a clearance defined between the valve 38 and a valve seat 40 on the diaphragm 32. On the other hand, the chamber 34 has a spring 42 contained therein for urging the diaphragm 32. The numeral 43 designates a finely adjusting screw member for adjusting the resilient force of the spring 42, and 44 designates a pump for pressurizing the fluid.

In the above arrangement, the fluid is pumped up from the tank 37 by the pump 44 and supplied under pressure to the communication port 35 of the pressure regulator D through the inlet 24. The pressure regulator D determines the rate of flow to be returned to the tank 37 from the communication port 35 via the chamber 33 and valve 38, thereby controlling the pressure P3 supplied to the inlet 24 to keep the pressure difference (P3-P4) at a constant value, where P4 is the discharge pressure downstream of the outlet 27. For example, if the discharge pressure P4 downstream of the outlet 27 of the flow rate measuring section C is reduced, the pressure in the chamber 34 of the pressure regulator D communicating therewith is also reduced, so that the diaphragm 32, with its equilibrium state now disturbed, is displaced upwardly as viewed in the illustration. This displacement increases a clearance 41 defined between the valve 38 and the valve seat 40 integral with said diaphragm 32, so that the rate of flow of the fluid to be returned to the tank 37 through said clearance is increased. As a result, the supply pressure P3 of the fluid to be supplied to the inlet 24 of the measuring section C via the pump 44 is reduced by an amount corresponding to the pressure drop caused to P4, and the pressure difference (P3-P4) between the supply pressure P3 and the discharge pressure P4 is kept at a constant value, whereby the rate of flow is uniquely proportional to the area of opening of the channel 29 defined between the taper bore 22 of the measuring section C and the ball 28.

The ball 28 of the measuring section C is pressed into contact with the right-hand end surface 31 of the control rod 20 by the pressure difference (P3-P4) and its axial position is controlled by the control rod 20. Moreover, the right-hand end surface 31 of the control rod 20 forms a slope with respect to the axis thereof, so that the ball 28 is downwardly pressed by a predetermined force to contact the taper bore 22 at a point. The channel 29 defined between the ball 28 and the taper bore 22 has a crescent shape, and the rate of flow of the fluid flowing through said channel 29 varies with the area of opening thereof. In this case, the velocity of the flow in the crescent channel is higher, entailing a pressure drop. As a result, a lift is exerted on the ball, but even under such circumstances the ball is kept in a stable state owing to the fact that the ball is pressed into contact with the end surface 31 of the control rod 20. A test using gasoline or mineral turpentine as the fluid, 4 mm as the diameter of the ball 28, 1/100 as the taper angle of the taper bore 22 and 1 kg/cm$^2$ as the pressure difference (P3-P4), revealed that the rate of flow controlled by the above described channel 29 varied between 10 cc/min. and 350 cc/min. and that the relation between the rate of flow and the position of the control rod 20 was linear. Further, it was found that an angle of 6° imparted to the end surface 31 of the control rod with respect to a plane at right angles with the axis thereof was capable of preventing the unstable vibration of the ball. Therefore, as can be seen also from this test result, it is possible to control the rate of flow of the fluid by the axial position of the control rod 20. Further, conversely, it is possible to know the rate of flow of the fluid by the axial position of the control rod 20.

If the area type flow rate measuring device of the above arrangement is applied, e.g., to a fuel supplying device for an internal combustion engine, it becomes possible to keep the air-fuel ratio at a constant value and this is convenient. More particularly, as shown in FIG. 1, the control rod 20 is inserted into the body of the flow rate measuring section C so that the amount of axial movement thereof may be proportional to the rate of flow of air flowing through the suction pipe. And, the outlet 27 of the measuring section C may be put in communication with the distributor or fuel injector. With such arrangement, the area of opening of the channel 29 becomes proportional to the rate of flow of suction air, with the result that the air fuel ratio is kept constant.

Figure 3:
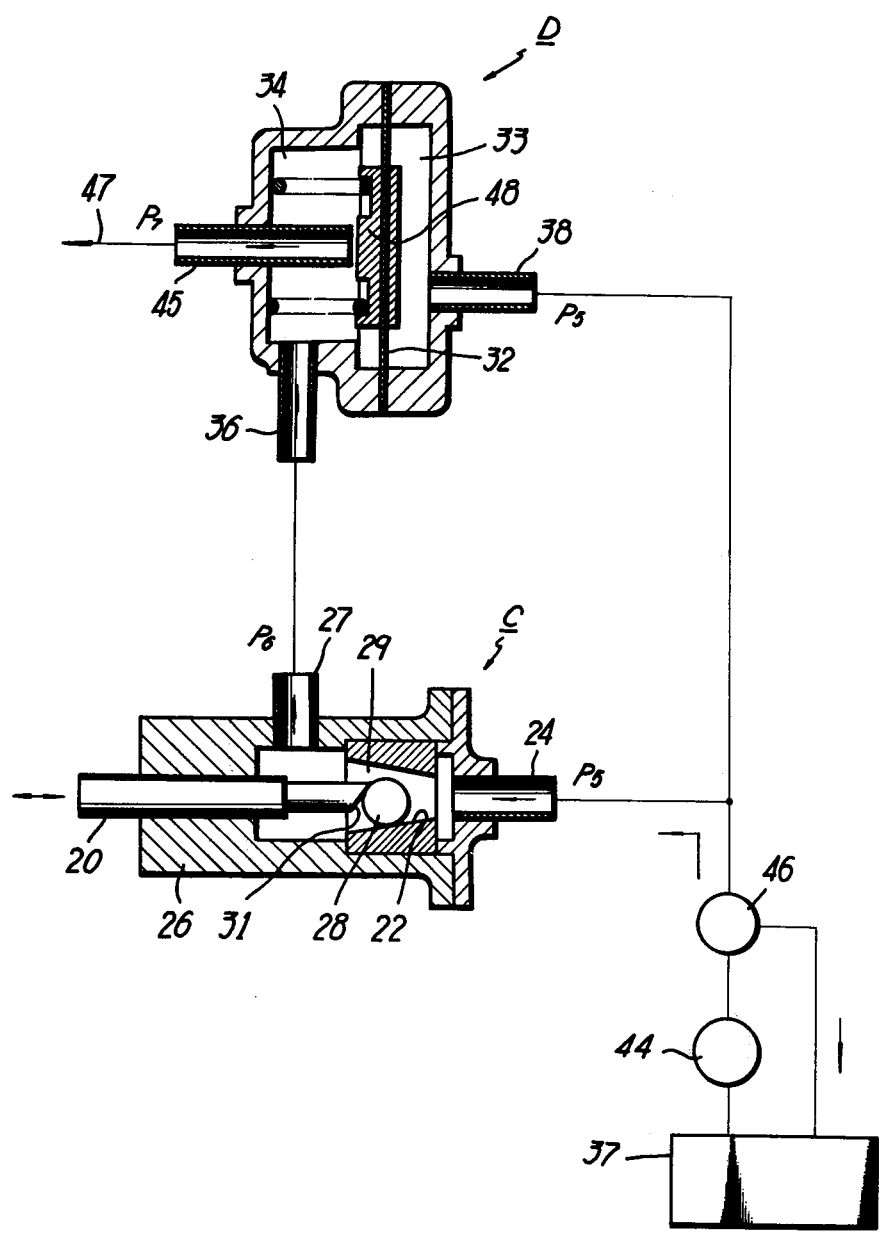
FIG. 3 is a diagrammatic view of an arrangement according to another embodiment of the invention.

FIG. 3 illustrates another embodiment of the present invention. A communication port 45 is newly provided in the chamber 34 of the pressure regulator D, said communication port 45 communicating with, e.g., the injection valve of the fuel injector of an internal combustion engine, while another communication port 36 communicates with the outlet 27 of the measuring section C. On the other hand, the chamber 33 communicates with a regulator 46 through the communication port 38, the pressure therein being kept at the supply pressure P5. The regulator 46 functions to keep constant the supply pressure from the pump 44, with the excess returning to the tank 37. In addition, the chamber 33 is not provided with a valve or valve seat. The rest of the arrangement is the same as in the embodiment shown in FIG. 2.

With the above arrangement, the pressures P5 and P6 act inside the chambers 33 and 34 of the pressure regulator D, respectively, so that the pressure difference (P5–P6) is detected as a displacement of the diaphragm 32; the pressure difference (P5–P6) between the inlet and outlet 24 and 27 of the measuring section C exhibits a constant value at all times. Moreover, there is almost no influence of the pressure P7 in a load channel 47 on the ball 28 and on the channel 29 of the measuring section C, thus providing for accurate measurements of the flow rate. It is to be noted that the displacement of said diaphragm 32 controls the area of opening of the clearance 48 between it and the communication port 45. Therefore, the rate of flow of the fluid flowing through the clearance 48 under the pressure difference (P6–P7) is uniquely determined by the rate of flow of the fluid flowing through the channel 29 under the pressure difference (P5–P6). The operation of the measuring section C including the channel 29 is the same as in the embodiment shown in FIG. 2.

In the invention, the bore 22 is not limited to a taper bore, and it may be any shape so long as it is capable of establishing a fixed relation between the rate of flow of the fluid flowing through the channel 29 and the axial position of the control rod 20 and ball 28.

Figure 4:
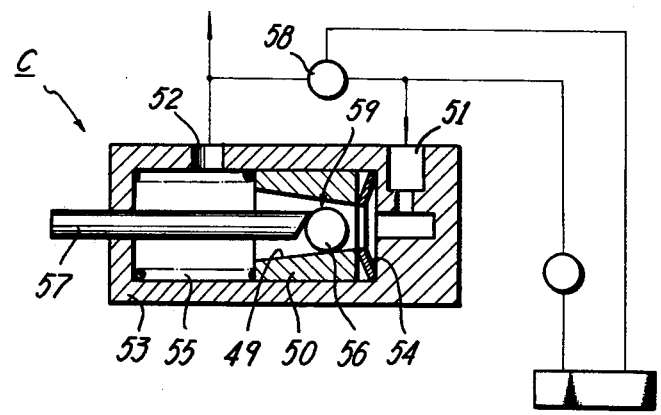
FIG. 4 is a diagrammatic view of a fuel flow rate measuring device which incorporates a mechanism for compensating for viscosity variations.

FIG. 4 shows a modification of the invention. A sleeve 50 having a bore whose cross-section is not axially uniform, e.g., a taper bore 49 is slidably disposed in a body 53 having an inlet 51 and an outlet 52, and a bimetal 54 and a spring 55 are respectively disposed between the body 53 and the opposite ends of the sleeve 50. The axial position of a ball 56 disposed in the bore 49 is controlled by the control rod 57 of the above-described suction air flow rate measuring device B, thereby assuring that the suction air flow rate uniquely corresponds to the fuel flow rate.

Generally, the flow rate Q of fuel to be measured is proportional to the square root of the pressure loss (drop) across the ball 56. The pressure drop across the ball 56 is kept at a constant value by interposing the pressure regulator 58 between the fuel supply port 51 and fuel out let 52 of the body 53. In this connection, when the temperature of the fuel varies, the viscosity of the fuel also varies, so that the fuel flow rate limited by the clearance 59 defined between the ball 56 and the bore 49 varies. That is, the higher the temperature, the greater the flow rate. In the present invention, however, under such circumstances, the bimetal 54 displaces the sleeve 50 to the left in the illustration against the force of the spring 55 so as to reduce the clearance 59, thereby compensating for variations in the flow rate due to temperature variations. This means that the air-fuel ratio is uniquely determined irrespective of variations in the temperature of fuel. A bimetal is a kind of temperature-sensitive body whose dimensions change in response to temperature. For this purpose, besides a bimetal, use may be made of a bellows, a wax element having wax contained therein, and the like.

Figure 5:
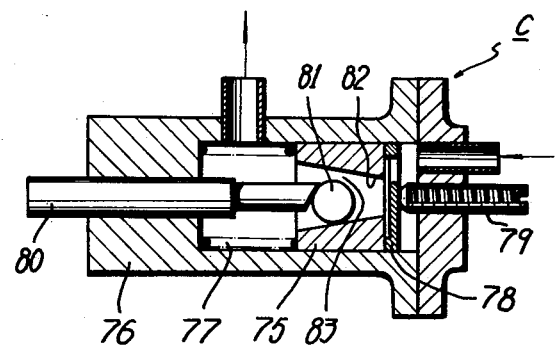
FIG. 5 is a diagrammatic view of a zero point adjusting mechanism.

FIG. 5 shows a zero point adjusting mechanism for an air flow rate measuring mechanism and for a fuel rate measuring mechanism. The sleeve 75 of the fuel rate measuring device C is slidably inserted in the body 76 and is urged against the front end surface of an adjusting screw 79 through the intermediary of a holder plate 78. With this arrangement, the turning of the adjusting screw results in a change in the axial position of the sleeve. Thus, the zero point of the control rod 80, or the zero point of the air flow rate detecting valve and the zero point of the clearance 83 defined by the ball 81 and taper bore 82 can be easily adjusted from the outside.

Figure 6:
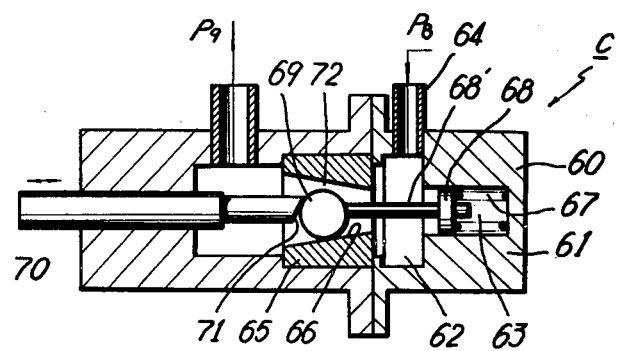
FIG. 6 is a diagrammatic view of a fuel flow rate measuring device which incorporates a mechanism for stabilizing a ball.

FIG. 6 shows another modification of the invention. A cover member 61 for the body 60 of the flow rate measuring section C is provided with chambers 62 and 63, said chamber 62 communicating with the inlet 64 and with the taper bore 66 of the sleeve 65, said chamber 63 having received therein a stabilizing rod 68 urged by an energy storing spring 67, the front end of the rod portion 68' of the stabilizing rod 68 being contacted with the ball 69. The ball 69 of the measuring section is urged against the right-hand end slope 71 of the control rod 70 by the pressure difference (P8–P9) and by the stored resilient force on the stabilizing rod 68. Therefore, the ball 69 is downwardly urged by a predetermined force into point contact with the taper bore 66. It is to be noted that the channel 72 defined between the ball 69 and the taper bore 66 has a crescent shape and that the rate of flow of the fluid flowing through said channel 72 varies with the area of opening thereof. In this case, the velocity of the fluid in the channel 72 is high and the pressure is reduced. In brief, exchange of energy is effected between the velocity energy and pressure energy of fluid. As a result, a lift is exerted on the ball 69, so that the latter tends to float up. However, the urging force of the energy storing spring 67 acting on the stabilizing rod 68 is transmitted to part of the ball 69 through the rod portion 68' thereof, thus forcing the ball into contact with the front end slope of the control rod, with the result that the ball can be stabilized by the downward force component.

In the fuel injector as shown in FIG. 1, the pulsation of air being drawn into the engine causes the vibration of the air flow rate detecting valve, often greatly detracting from the accuracy of control of the position of the control rod. This vibration tends to be sever particularly in the low-speed high-load region. FIG. 7 shows a mechanism for attenuating the vibration of the air flow rate detecting valve. The control rod 84 is provided with a portion 84b which is larger in diameter than the guide portion 84a thereof. The large diameter portion 84b is received in the recess 87 of the body 86 with a suitable clearance. With this arrangement, the leftward movement of the control rod 84 causes the fuel in the cavity 88 to be forced out through the clearance 85, while the rightward movement of the control rod causes the fuel in the body to be drawn into the cavity 88. At this time, the viscous resistance of the fuel flowing through the clearance 85 produces a positive or negative pressure in the cavity, which pressure creates a resistance to the movement of the control rod. Thus, this arrangement has the function of a damper, adding to the effect of attenuating forced vibration.

FIG. 8 shows a device for compensating the air-fuel ratio so as to suit it to the operating conditions. For example, the device will function to increase the proportion of fuel to suction air during warming up. This compensating mechanism E comprises a variable choke 92 placed in a return channel 91 from the primary pressure chamber 90 of a pressure regulator D, a/a controller 93 for controlling the degree of opening of said variable choke, and a sensor 94 for actuating said controller 93, said variable choke 92 being fully opened during normal operation. Fuel is pressurized by a pump 95 to flow through an inlet 96, a gate 97 and an outlet 98 and then into the secondary pressure chamber 99 of the pressure regulator D, from which it is fed to the fuel injector via a valve 100. In this arrangement, when the temperature sensor 94 attached to the radiator or water tank of the engine senses the temperature of the cooling water 101, the controller 93 is actuated to open the variable choke 92, which is now completely closed, thereby reducing the pressure in the primary chamber 90 of the pressure regulator D. Therefore, the diaphragm 102 is displaced to the right in the illustration to increase the degree of opening of the valve 100, thereby permitting more fuel to be fed. Upon completion of the warming up, the temperature of the cooling water is raised, so that the variable choke 92 is again closed completely, with engine restored to the normal operating conditions. As for the signal used to actuate the controller, instead of the water sensor, it is possible to utilize a signal which simulates variations in water temperature, e.g., a displacement of a bimetal heated by an electric heater.

FIG. 9 shows a device using a so-called oxygen sensor 104 attached to an exhaust pipe 103 so as to detect the concentration of oxygen in the exhaust gas. In the illustration, 105 designates a variable choke placed in the channel 106 of a pressure regulator: 107 designates a fixed choke placed in a return channel 108;and 109 designates a controller for controlling the variable choke 105 by the output from the oxygen sensor 104. In the above-described compensating mechanism E, the sensor is initially set for fuel richness. When the sensor detects an increase in the remaining oxygen concentration, a signal from the sensor 104 actuates the controller 109 to increase the degree of opening of the initially opened variable choke 105. The increase in the degree of opening of the variable choke 105 causes an increase in the pressure in the primary pressure chamber 110, moving the diaphragm 111 in such a direction as to reduce the degree of opening of the valve 112, so that the proportion of fuel to air is reduced. As a result, the concentration of remaining oxygen is reduced and the sensor output becomes zero. Then the variable choke 105 resumes the initial degree of opening, thus shifting the air-fuel ratio to the fuel-rich side. With such operation repeated, the air-fuel ratio ultimately approached the theoretical air-fuel ratio.

While specific embodiments of the invention have been described in detail with reference to the accompanying drawings, it is to be understood that the invention is not limited thereto and that various changes and modifications may be made by those skilled in the art without departing from the spirit and scope of the invention.

What is claimed is:

1. A fuel flow rate measuring device comprising a flow rate measuring section which is composed of a body having a bore whose cross-section is not uniform in the longitudinal direction, a fuel inlet communicating with said bore and a fuel outlet communicating with said bore, and a ball placed in said bore; a control rod, the clearance between said bore and ball being adjustable in accordance with an axial movement of said control rod; and a pressure regulator communicating with said fuel inlet and outlet for keeping constant the pressure difference between said inlet and outlet sides, the arrangement being such that the axial position of said control rod and the rate of flow of the fuel correspond to each other in a fixed relation.

2. A fuel flow rate measuring device as set forth in claim 1, wherein said bore is in the form of a taper bore.

3. A fuel flow rate measuring device as set forth in claim 1, wherein the amount of axial movement of said control rod is proportionated to the rate of flow of air flowing through an air suction pipe by an output from an air flow rate measuring device.

4. A fuel flow rate measuring device as set forth in claim 1, wherein the front end surface of said control rod is formed with a slope having a downward inclination with respect to the axis of said control rod so that the ball is pressed against the front end slope of said control rod by the pressure of the fluid.

5. A fuel flow rate measuring device as set forth in claim 1, wherein a sleeve having a bore whose cross-section is not axially uniform is slidably disposed inside said body, while a temperature-sensitive element is disposed between said sleeve and said body, so that in connection with variations in the temperature of the fluid said sleeve is axially displaced by said temperature-sensitive element.

6. A fuel flow rate measuring device as set forth in claim 1, wherein a sleeve having a bore whose cross-section is not axially uniform is slidably disposed inside said body, and is pressed against the end surface of an adjusting screw by a spring through a holder plate.

7. A fuel flow rate measuring device as set forth in claim 1, a portion of said control rod is formed with a large diameter step which cooperates with the bore of said body to define a cavity therebetween, said cavity communicating with a fluid channel through a narrow channel existing around said step, so as to provide a damper mechanism.

8. A fuel flow rate measuring device as set forth in claim 1, wherein a stabilizing rod acted upon by a stored resilient force is opposed to said control rod which controls the axial position of said ball, said stabilizing rod forcing said ball into contact with a slope formed on the front end of said control rod.

* * * * *